(12) United States Patent
Thielen et al.

(10) Patent No.: US 7,671,128 B1
(45) Date of Patent: Mar. 2, 2010

(54) TIRE WITH A COMPONENT MADE OF A RUBBER COMPOSITION COMPRISED OF RUBBERS HAVING PENDANT HYDROXYL GROUPS

(75) Inventors: Georges Marcel Victor Thielen, Schouweiler (LU); Frank Schmitz, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/421,661

(22) Filed: Apr. 10, 2009

(51) Int. Cl.
*B60C 1/00* (2006.01)
*C08L 33/24* (2006.01)

(52) U.S. Cl. ..................... 524/526; 525/218
(58) Field of Classification Search .................. 524/526
See application file for complete search history.

(56) References Cited

U.S. PATENT DOCUMENTS

| | | | |
|---|---|---|---|
| 6,716,925 B2 * | 4/2004 | Thielen et al. | 525/218 |
| 7,294,666 B2 | 11/2007 | Thielen | 524/492 |
| 7,476,708 B2 | 1/2009 | Thielen et al. | 525/79 |

* cited by examiner

*Primary Examiner*—Ling-Siu Choi
*Assistant Examiner*—Hui Chin
(74) *Attorney, Agent, or Firm*—John D. DeLong

(57) ABSTRACT

The present invention is directed to a tire comprising at least one component comprising (A) a first copolymer rubber comprised of repeat units derived from
  (1) 10 to 99 weight percent of a conjugated diene monomer which contains from 4 to 8 carbon atoms;
  (2) 0 to 70 weight percent of a vinyl substituted aromatic monomer; and
  (3) 1 to 20 weight percent of at least one co-monomer selected from the group consisting of the following general formulas I:

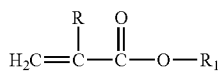

I wherein R represents a hydrogen atom or an alkyl group containing from 1 to 8 carbon atoms;
wherein $R_1$ represents a saturated alcohol group containing from 1 to 8 carbon atoms; and (B) a second copolymer rubber comprised of repeat units derived from
  (1) 10 to 99 weight percent of a conjugated diene monomer which contains from 4 to 8 carbon atoms;
  (2) 0 to 70 weight percent of a vinyl substituted aromatic monomer; and
  (3) 1 to 20 weight percent of at least one co-monomer selected from the group consisting of the following general formulas I:

I wherein R represents a hydrogen atom or an alkyl group containing from 1 to 8 carbon atoms;
wherein $R_1$ represents a saturated alcohol group containing from 1 to 8 carbon atoms;
wherein the first and second copolymer have a difference in glass transition temperatures ranging from 30° C. to 60° C.

10 Claims, 1 Drawing Sheet

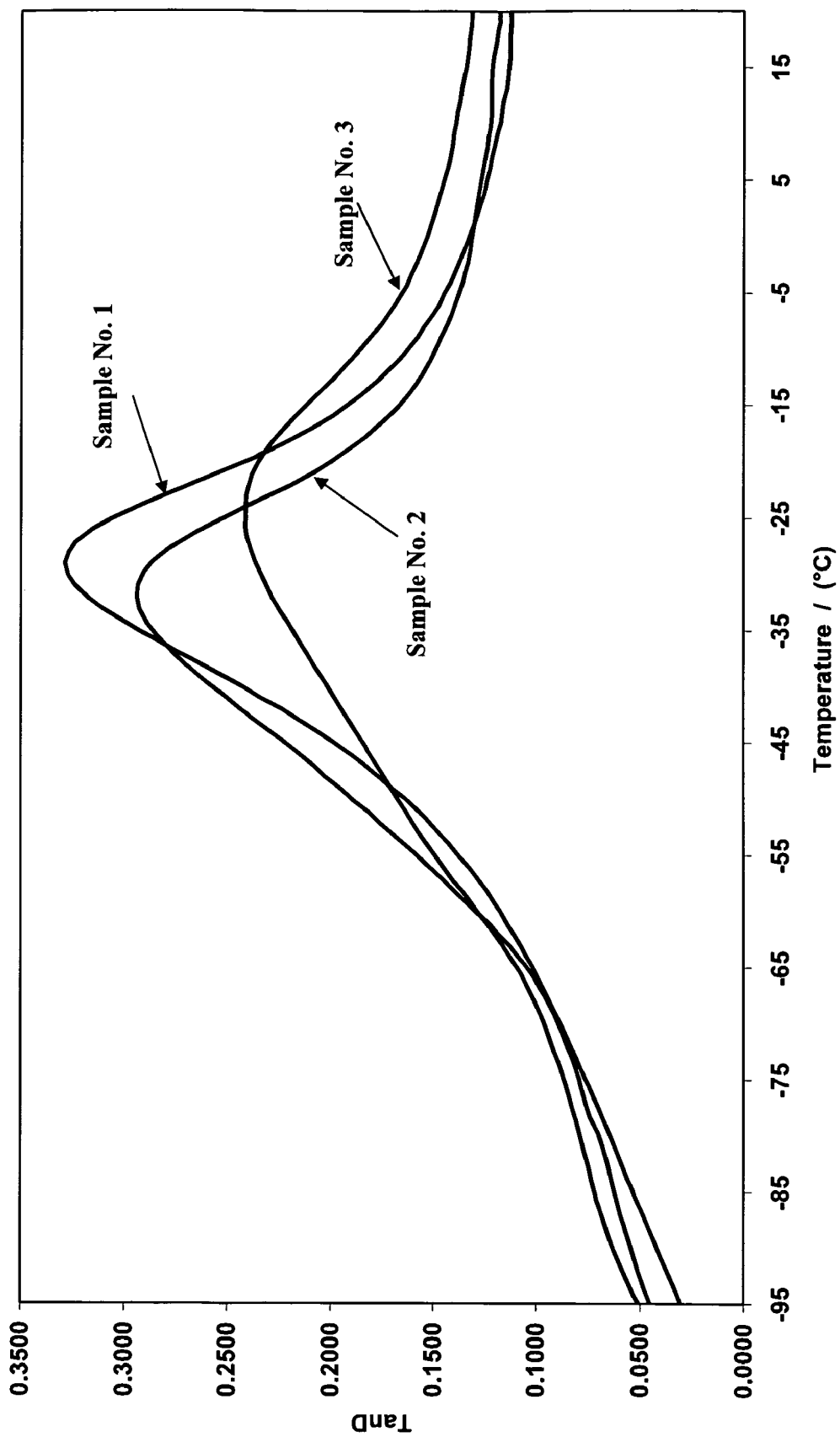

TIRE WITH A COMPONENT MADE OF A RUBBER COMPOSITION COMPRISED OF RUBBERS HAVING PENDANT HYDROXYL GROUPS

BACKGROUND OF THE INVENTION

Vehicular tires, particularly pneumatic tires, are sometimes provided with a component such as, for example, a tread which is comprised of a rubber composition which contains two or more rubbers or elastomers.

Elastomer blends which contain, for example, c is 1,4-polybutadiene and styrene/butadiene elastomers are often used for such tire component (e.g. tire tread). Rubber compositions may also contain various amounts of additional diene-based elastomers such as, for example, one or more of cis 1,4-polyisoprene, c is 1,4-polybutadiene, medium vinyl polybutadiene, styrene/butadiene copolymers, isoprene/butadiene copolymers, and minor amounts of 3,4-polyisoprene.

For the above mentioned styrene/butadiene copolymer rubber, both emulsion polymerization prepared and organic solvent polymerization prepared styrene/butadiene copolymer elastomers have been used. Also, historically, emulsion polymerization derived copolymer elastomers comprised of units derived from styrene and 1,3-butadiene together with an additional monomer have been prepared and proposed for use for various products.

U.S. Pat. No. 5,902,852 discloses the modification of an asphalt cement with a rubbery copolymer prepared by emulsion polymerization which is comprised of repeat units derived from conjugated diolefin monomer, such as, for example, c is 1,4-polybutadiene, vinyl aromatic monomer such as styrene and a small amount of hydroxypropyl methacrylate (HPMA).

U.S. Pat. No. 6,057,397 discloses use of a copolymer of cis 1,4-polybutadiene, styrene and, for example hydroxypropyl methacrylate in rubber compositions.

Hydroxy-containing polymers are disclosed in U.S. Pat. Nos. 4,150,014, 4,150,015, 4,152,308 and 4,357,432.

U.S. Pat. No. 6,716,925 discloses use of a hydroxy-containing rubber with a rubber containing a nitrile moiety.

U.S. Pat. No. 7,476,708 discloses use of a hydroxyl-containing rubber with a nonsulfur containing silane.

SUMMARY OF THE INVENTION

The present invention relates to a rubber composition which is particularly suited for use in a tire. The composition is characterized by two copolymer rubbers each having a pendant hydroxyl group, wherein the glass transition temperature of the copolymer rubbers is spaced by a range of from 30 to 60° C.

BRIEF DESCRIPTION OF THE DRAWING

The sole drawing shows a graph of tangent delta (TanD) versus temperature for three example rubber compounds.

DETAILED DESCRIPTION OF THE INVENTION

There is disclosed a tire having at least one component comprising
(A) a first copolymer rubber comprised of repeat units derived from
(1) 10 to 99 weight percent of a conjugated diene monomer which contains from 4 to 8 carbon atoms;
(2) 0 to 70 weight percent of a vinyl substituted aromatic monomer; and
(3) 1 to 20 weight percent of at least one co-monomer selected from the group consisting of the following general formulas I:

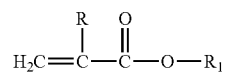

wherein R represents a hydrogen atom or an alkyl group containing from 1 to 8 carbon atoms;
wherein $R_1$ represents a saturated alcohol group containing from 1 to 8 carbon atoms; and
(B) a second copolymer rubber comprised of repeat units derived from
(1) 10 to 99 weight percent of a conjugated diene monomer which contains from 4 to 8 carbon atoms;
(2) 0 to 70 weight percent of a vinyl substituted aromatic monomer; and
(3) 1 to 20 weight percent of at least one co-monomer selected from the group consisting of the following general formulas I:

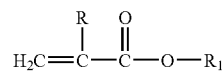

wherein R represents a hydrogen atom or an alkyl group containing from 1 to 8 carbon atoms;
wherein $R_1$ represents a saturated alcohol group containing from 1 to 8 carbon atoms; wherein the first and second copolymer have a difference in glass transition temperatures ranging from 30° C. to 60° C.

In the description of this invention, the terms "rubber" and "elastomer" when used herein, are used interchangeably, unless otherwise prescribed. The terms "rubber composition," "compounded rubber" and "rubber compound," if used herein, are used interchangeably to refer to "rubber which has been blended or mixed with various ingredients and materials" and such terms are well known to those having skill in the rubber mixing or rubber compounding art.

The term "phr" if used herein, and according to conventional practice, refers to "parts of a respective material per 100 parts by weight of rubber, or elastomer."

The Tg of an elastomer, if referred to herein, refers to a "glass transition temperature" of the elastomer which can conveniently be determined by a differential scanning calorimeter at a heating rate of 10° C. per minute.

The rubber composition includes first and second copolymer rubbers, each derived from a conjugated diene monomer, optionally a vinyl substituted aromatic monomer, and an hydroxyl containing co-monomer.

Representative examples of conjugated diene monomers which may be used include 1,3-butadiene, isoprene, 1,3-ethylbutadiene, 1,3-pentadiene, 1,3-hexadiene, 1,3-cyclooctadiene, 1,3-octadiene and mixtures thereof. Preferably, the conjugated diene is 1,3-butadiene. The copolymer will contain repeat units derived from 10 to 99 weight percent of the conjugated diene. Alternatively, the copolymer will contain repeat units derived from 30 to 89 weight percent of the conjugated diene. Preferably, from 50 to 80 weight percent of the copolymer will be derived from the conjugated diene.

The first and second copolymers may also be derived from a vinyl substituted aromatic monomer. The vinyl-substituted aromatic compound may contain from 8 to 16 carbon atoms. Representative examples of vinyl substituted aromatic monomers are styrene, alpha methyl styrene, vinyl toluene, 3-methyl styrene, 4-methyl styrene, 4-cyclohexylstyrene, 4-paratolylstyrene, para-chlorostyrene, 4-tert-butyl styrene, 1-vinylnaphthalene, 2-vinylnaphthalene and mixtures thereof. Preferably, styrene is used. The copolymer will contain repeat units derived from 0 to 70 weight percent of the vinyl substituted aromatic monomer. Alternatively, from 10 to 50 weight percent of the copolymer is derived from a vinyl substituted aromatic monomer. Preferably, from 20 to 40 weight percent of the copolymer is derived from a vinyl substituted aromatic monomer.

The first and second copolymers are also derived from a hydroxyl containing monomer. One to 20 weight percent of the copolymer is derived from the hydroxy containing monomers. Preferably, from 1 to 5 weight percent of the copolymer is derived from these monomers. The hydroxyl containing co-monomer may be a hydroxyl alkyl acrylate of formula I as seen below.

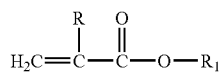

I wherein R represents a hydrogen atom or an alkyl group containing from 1 to 8 carbon atoms. Preferably, R is a hydrogen atom or an alkyl group having from 1 to 4 carbon atoms. $R_1$ is a saturated alcohol group containing from 1 to 8 carbon atoms. Preferably, $R_1$ has from 1 to 4 carbon atoms. The saturated alcohol group may be a primary, secondary or tertiary alcohol group.

The hydroxy alkyl acrylate co-monomer of structural formula I may be hydroxymethyl methacrylate, 2-hydroxyethyl methacrylate (HEMA), 2-hydroxypropyl methacrylate (HPMA isomer), 3-hydroxypropyl methacrylate (HPMA isomer), 3-phenoxy-2-hydroxypropyl methacrylate, hydroxybutyl methacrylate, hydroxyhexyl methacrylate, hydroxyoctyl methacrylate and mixtures thereof. Preferably the hydroxyalkyl acrylate co-monomer of structural formula I is hydroxymethyl methacrylate, 2-hydroxyethyl methacrylate, 2-hydroxypropyl methacrylate, 3-hydroxypropyl methacrylate and mixtures thereof.

When mixtures of such co-monomers are selected, the mixtures may comprise 2-hydroxypropyl methacrylate and 3-hydroxy-propyl methacrylate (HPMA isomers), a blend in weight ratio, for example, in a range of from about 85/15 to about 60/40, respectively.

Preferably, the first and second copolymer elastomers are further characterized by a glass transition (Tg) in a range of about 0° C. to about –80° C., with a range of from about –70° C. to about –20° C. being particularly preferred.

Further, the first and second copolymer elastomers have glass transition temperatures such that the difference in the glass transition temperature of the two copolymer elastomers ranges from 30° C. to 60° C. That is, the glass transition temperatures of the first and second copolymer elastomers are spaced apart by a range of from 30° C. to 60° C.

The copolymer may have a Mooney viscosity (M/L 1+4 at 100° C.) that varies. Suitable copolymers have a Mooney viscosity as low as 15 to as high as 150. Preferably, the Mooney viscosity ranges from 50 to 120.

The aforesaid first and second copolymer elastomer can be synthesized, for example, by using conventional elastomer emulsion polymerization methods. For example, a charge composition may be comprised of water, one or more conjugated diolefin monomers, (e.g., 1,3-butadiene), one or more vinyl aromatic monomers (e.g., styrene) and HEMA, a suitable polymerization initiator and emulsifier (soap). The copolymerization may be conducted over a relatively wide temperature range such as for example, from about 4° C. to as high as 60° C., although a temperature in a range of about 4° C. to about 10° C. may be more desirable.

The emulsifiers may be added at the onset of the polymerization or may be added incrementally, or proportionally as the reaction proceeds. Anionic, cationic or nonionic emulsifiers may be employed.

The first and second copolymer elastomers may be used in the rubber composition in a weight ratio of first copolymer elastomer to second copolymer elastomer ranging from 9:1 to 1:9. Preferably, the weight ratio of first copolymer elastomer to second copolymer elastomer ranges from 3:1 to 1:3. More preferably, the weight ration of first copolymer elastomer to second copolymer elastomer ranges from 2:1 to 1:2.

In addition to the first and second copolymer elastomers, the rubber composition or rubber component may contain one or more additional conjugated diene-based elastomers. When used, the additional rubber or rubbers generally range from 0 to 95 phr of the total rubber used. Preferably, the additional rubber will range from 10 to 90 phr with 90 to 10 phr being the total of the first and second copolymer elastomers.

Representative of various additional conjugated diene-based elastomers for use in this invention include, for example, c is 1,4-polyisoprene rubber (natural or synthetic), c is 1,4-polybutadiene, high vinyl polybutadiene having a vinyl 1,2 content in a range of about 30 to about 90 percent, styrene/butadiene copolymers (SBR) including emulsion polymerization prepared SBR and organic solvent polymerization prepared SBR, styrene/isoprene/butadiene copolymers, isoprene/butadiene copolymers and isoprene/styrene copolymers. In one embodiment, the additional conjugated diene-based elastomer comprises a styrene-butadiene rubber having a bound styrene content of at least 36 percent by weight.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE, RAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products and British Standard* 2000 *Parts,* 2003, 62nd edition, published by the Institute of Petroleum, United Kingdom.

The rubber composition may include from about 30 to about 150 phr of silica. In another embodiment, from 60 to 120 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm³/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or U.S. Pat. No. 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

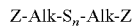     II in which Z is selected from the group consisting of

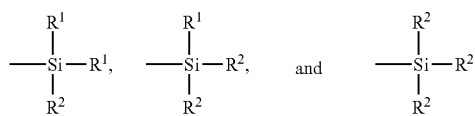

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula II, Z may be

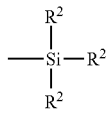

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials.

In another embodiment, suitable sulfur containing organosilicon compounds include compounds disclosed in U.S. Publication 2006/0041063. In one embodiment, the sulfur containing organosilicon compounds include the reaction product of hydrocarbon based diol (e.g., 2-methyl-1,3-propanediol) with S-[3-(triethoxysilyepropyl)]thiooctanoate. In one embodiment, the sulfur containing organosilicon compound is NXT-Z™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting examples.

EXAMPLE

In this example, the effect of combining two functionalized styrene-butadiene rubbers is illustrated. The two functionalized styrene-butadiene rubbers represent in this embodiment the first and second copolymer elastomers of the present invention. Three rubber compounds were prepared to demonstrate the significance of the combination of a copolymer rubber having pendant hydroxyl groups in combination with another copolymer rubber having pendant hydroxyl groups, with the two copolymer rubbers having spaced apart glass transition temperatures. Samples 1 and 2 are considered Controls due to the absence of the combination of copolymer rubber having pendant hydroxyl groups with spaced apart glass transition temperatures. Sample 3 is considered representative of the present invention.

The rubber compositions were prepared in an internal rubber mixer using three separate stages of addition (mixing), namely, two sequential non-productive mix stages (without the sulfur and accelerator curatives) to a temperature of about 160° C. and one final productive mix stage (with sulfur and accelerator curatives) to a temperature of about 115° C.

Materials used for this Example are illustrated in the following Table 1. The physical properties of the rubber samples are shown in Table 2.

TABLE 1

| | Sample No. | | |
|---|---|---|---|
| | 1 | 2 | 3 |
| First Non-Productive Mix Step | | | |
| Type | Control | Control | Inventive |
| Polybutadiene[1] | 40 | 40 | 40 |
| ESBR, high styrene, Tg −36° C.[2] | 24.1 | 24.1 | 0 |
| ESBR, med styrene, Tg −52° C.[3] | 24.1 | 0 | 0 |
| ESBR-OH, Tg −70° C.[4] | 0 | 17.5 | 17.5 |
| ESBR-OH, Tg −30° C.[5] | 0 | 0 | 17.5 |
| SSBR, high styrene[6] | 34.4 | 34.4 | 34.4 |
| Antidegradant[7] | 2.5 | 2.5 | 2.5 |
| TDAE oil | 15.38 | 22.38 | 27.38 |
| stearic acid | 3 | 3 | 3 |
| silane[8] | 6.56 | 6.56 | 6.56 |
| silica | 105 | 105 | 105 |
| Second Non-Productive Mix Step | | | |
| carbon black | 5 | 5 | 5 |
| waxes[9] | 1.5 | 1.5 | 1.5 |
| Productive Mix Step | | | |
| antidegradant | 0.5 | 0.5 | 0.5 |
| zinc oxide | 2.5 | 2.5 | 2.5 |

TABLE 1-continued

| | Sample No. | | |
|---|---|---|---|
| | 1 | 2 | 3 |
| sulfur | 1.4 | 1.4 | 1.4 |
| accelerators[10] | 3.9 | 3.9 | 3.9 |

[1]Budene 1207 from The Goodyear Tire & Rubber Co.
[2]Styrene/butadiene copolymer elastomer, extended with 37.5 phr TDAE oil, prepared by aqueous emulsion polymerization; styrene content of about 40 weight percent; glass transition temperature (Tg) of about $-36°$ C. at a DSC (scanning calorimeter) mid-point.
[3]Styrene/butadiene copolymer elastomer, extended with 37.5 phr TDAE oil, prepared by aqueous emulsion polymerization; styrene content of about 23.5 weight percent; glass transition temperature (Tg) of about $-52°$ C. at a DSC (scanning calorimeter) mid-point.
[4]Styrene/butadiene/HEMA copolymer elastomer, non-oil extended, prepared by aqueous emulsion polymerization with hydroxyethyl methacrylate (HEMA) of about 7.5 weight percent; glass transition temperature (Tg) of about $-70°$ C. at a DSC (scanning calorimeter) mid-point.
[5]Styrene/butadiene/HEMA copolymer elastomer, non-oil extended, prepared by aqueous emulsion polymerization; hydroxyethyl methacrylate (HEMA) of about 7.5 weight percent; glass transition temperature (Tg) of about $-30°$ C. at a DSC (scanning calorimeter) mid-point.
[6]Styrene/butadiene copolymer elastomer, extended with 37.5 phr TDAE oil, prepared by solution polymerization; styrene content of about 40 weight percent; vinyl content 24 weight percent, glass transition temperature (Tg) of about $-28°$ C. at a DSC (scanning calorimeter) mid-point
[7]Phenylenediamine type
[8]Bis-(3-triethoxysilylproyl) disulfide (obtained as Si266 from Degussa S.A.)
[9]Microcrystalline and paraffinic waxes
[10]Sulfenamide and guanidine types

TABLE 2

| | | Sample No. | | |
|---|---|---|---|---|
| | | 1 | 2 | 3 |
| Type | | Control | Control | Inventive |
| MV2000 Plasticity | | | | |
| MS (1 + 1.5) | Mooney Units | 47.5 | 47.3 | 53.2 |
| MV2000 Scorch | | | | |
| T + 5 | min | 34.1 | 27.4 | 23.7 |
| T + 20 | min | 43.7 | 33.9 | 28.9 |
| MDR2000 Light Tire | | | | |
| Amount | dN · m | 13.9 | 12.6 | 11.7 |
| Scorch 1 | min | 1.4 | 2.2 | 2.4 |
| T25 | min | 3.3 | 3 | 2.9 |
| T90 | min | 6.2 | 5.3 | 5 |
| RPA2000 | | | | |
| G' 1% | MPa | 3.05 | 3.18 | 2.64 |
| G' 10% | MPa | 1.66 | 1.67 | 1.62 |
| G' 50% | MPa | 0.77 | 0.72 | 0.82 |
| tan d 1% | | 0.197 | 0.2 | 0.169 |
| G' 50%/G' 1% | | 0.25 | 0.23 | 0.31 |
| tan d 10% | | 0.174 | 0.183 | 0.161 |
| Ring Modulus | | | | |
| Mod 100% | MPa | 1.7 | 2 | 2.4 |
| Mod 300% | MPa | 8.1 | 9.6 | 12.3 |
| Mod 300/100 ratio | | 4.8 | 4.8 | 5.1 |
| Rotary Drum Abrasion | | | | |
| DIN Abrasion | mm³ | 117 | 107 | 105 |

The data of this example illustrated the effect of the invention, that is, that a combination of two hydroxylated ESBR with spaced apart Tg in a rubber composition results in superior performance than for a similar composition with two or one non-hydroxylated ESBR.

Referring now to the data of Table 2, replacement of medium styrene ESBR with Tg of $-52°$ C. of sample 1 with a hydroxylated ESBR with Tg of $-70°$ C. in sample 2 resulted in no appreciable effect on tangent delta, strain dependence of G', or high strain behavior as indicated by the 300%/100% modulus ratio. An improvement in abrasion resistance is observed, but can be attributed to the depression in Tg. Thus replacement of one of the non-hydroxylated ESBR of sample 1 with a hydroxylated ESBR has little effect.

By contrast, replacement of both of the Tg spaced ESBR of sample 1 with two hydroxylated ESBR in sample 3 yields surprising and unexpected results. In particular, a reduced Payne effect is observed for sample 3 as compared with samples 1 or 2. This is seen by comparing the G' 50%/G' 1% ratio, which indicates the degree of the strain dependence of the dynamic storage modulus. The Payne effect is the nonlinear dynamic mechanical property of elastomers in the presence of filler first studied by Payne, Appl. Polym. Sci., 6, 57 (1962). It is generally associated with the breakdown and agglomeration of filler particles. Filler-matrix interactions are also thought to be contributing factors to the Payne effect. Such processes are the slippage of entanglements between bound rubber and the mobile rubber phase, molecular surface slippage or rearrangement and release of trapped rubber within the filler network. The magnitude of strain dependence of dynamic moduli increases with decreasing molecular weight and strongly reduced by increasing polymer-filler interaction, i.e, by the use of coupling agents. See, e.g., G. Heinrich et al., Advances in Polymer Science, 160, 1436-5030 (2002); S. S. Sternstein et al., Macromolecules, 35, 7262-7273 (2002); Ai-Jun Zhu et al., Composite Science and Technology, 63, 1113-1126 (2003); J. D. Ulmer et al., Rubber Chem. & Techn., 71(4), 637-667 (1998); C. Gauthier et al., Polymer, 45, 2761-2771 (2003). Therefore measurement of Payne effect is highly suitable to quantify polymer-filler interactions. Again referring to the data of Table 2, it is seen that the G' 50%/G' 1% ratio for sample 3 is significantly higher that for samples 1 or 2, indicating a much lower strain dependence of the dynamic modulus due to superior polymer-filler interaction for sample 3. Such behavior is surprising and unexpected as no previous experience of such behavior is known to the inventors.

Further, the high strain modulus ratio Mod 300%/100% is also significantly higher for sample 3 compared to samples 1 and 3, again indicating superior reinforcement. This behavior is also surprising and unexpected.

Tan delta behavior for the rubber composition indicates that the composition of sample 3 has superior performance. The drawing shows a graph of tangent delta (ie, TanD) versus temperature for each of samples 1, 2 and 3. As is evident, in the temperature range of $-10°$ C. to $+10°$ C., tangent delta for sample 3 is significantly higher than that of samples 1 or 2, indicating superior wet braking. This behavior is also surprising and unexpected as it is combined with a lower dynamic stiffness (G' shear modulus in MPa) at temperatures below $-30°$ thus indicative of improved winter performance at superior wet braking. The SMD 2000 test results shown in the drawing are reported as tan delta data obtained for a temperature sweep in a dynamic shear mode at a frequency of 1 Hertz and at an angle of 0.00583 rad.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprising
   (A) a first copolymer rubber comprised of repeat units derived from (1) 10 to 99 weight percent of a conjugated diene monomer which contains from 4 to 8 carbon atoms;
(2) 0 to 70 weight percent of a vinyl substituted aromatic monomer; and
(3) 1 to 20 weight percent of at least one co-monomer selected from the group consisting of the following general formulas I:

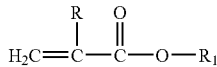

wherein R represents a hydrogen atom or an alkyl group containing from 1 to 8 carbon atoms;
wherein $R_1$ represents a saturated alcohol group containing from 1 to 8 carbon atoms; and
(B) a second copolymer rubber comprised of repeat units derived from
(1) 10 to 99 weight percent of a conjugated diene monomer which contains from 4 to 8 carbon atoms;
(2) 0 to 70 weight percent of a vinyl substituted aromatic monomer; and
(3) 1 to 20 weight percent of at least one co-monomer selected from the group consisting of the following general formulas I:

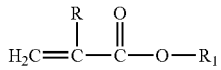

wherein R represents a hydrogen atom or an alkyl group containing from 1 to 8 carbon atoms;
wherein $R_1$ represents a saturated alcohol group containing from 1 to 8 carbon atoms;
wherein the first and second copolymer rubbers have a difference in glass transition temperatures ranging from 30° C. to 60° C.

2. The rubber composition of claim 1 wherein said conjugated diene monomer is 1,3-butadiene and the vinyl substituted aromatic monomer is styrene.

3. The rubber composition of claim 1 further comprising from 20 to 120 phr of silica.

4. The rubber composition of claim 1 wherein the Tg of each of the copolymer elastomers ranges from 0° C. to −80° C.

5. The rubber composition of claim 1 further comprising at least one additional rubber selected from the group consisting of cis 1,4-polyisoprene rubber, c is 1,4-polybutadiene, high vinyl polybutadiene, styrene/butadiene copolymers, styrene/isoprene/butadiene copolymers, 3,4-polyisoprene, isoprene/butadiene copolymers and isoprene/styrene copolymers.

6. The rubber composition of claim 5 wherein the at least one additional rubber comprises a styrene-butadiene rubber having a bound styrene content of at least 36 percent by weight.

7. The rubber composition of claim 1 wherein the weight ratio of the first copolymer elastomer to the second copolymer elastomer ranges from 9:1 to 1:9.

8. The rubber composition of claim 1 wherein the weight ratio of the first copolymer elastomer to the second copolymer elastomer ranges from 3:1 to 1:3.

9. The rubber composition of claim 1 wherein the weight ratio of the first copolymer elastomer to the second copolymer elastomer ranges from 2:1 to 1:2.

10. A tire comprising at least one component comprising the composition of claim 1.

* * * * *